3,249,555
REACTIVATION OF CALCIUM AND COPPER PHOSPHATES CATALYST
Charles A. Wentz, Jr., Bartlesville, Okla., assignor to Phillips Petroleum Company, a corporation of Delaware
Filed Oct. 21, 1963, Ser. No. 317,457
9 Claims. (Cl. 252—412)

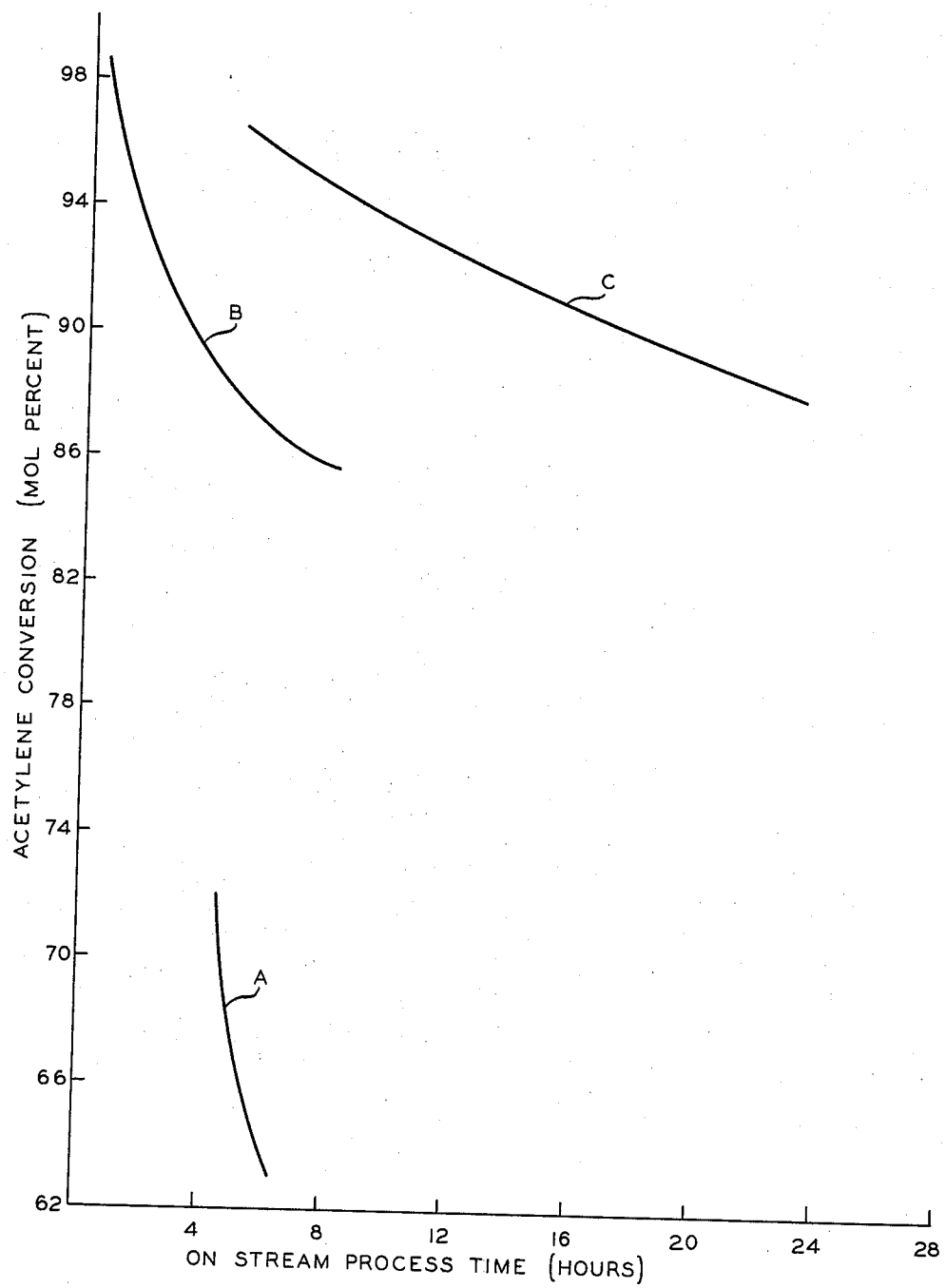

This invention relates to a process for reactivating a calcium phosphate-copper phosphate catalyst for the hydration of acetylene.

The hydration of acetylene to form acetaldehyde is a conventional process which frequently utilizes as the catalyst for the reaction calcium ortho phosphate in admixture with a minor concentration of copper ortho phosphate. One of the problems involved in this process is the fairly rapid decrease in the activity of the catalyst. In order for the process to be economically feasible, the catalyst must have an acetylene conversion of more than about 70 mol percent. A fresh calcium ortho phosphate-copper ortho phosphate catalyst, when properly made, has an activity of more than 98 mol per cent conversion of acetylene. Even with catalysts of this high activity, the conversion drops to below about 75 mol percent conversion within 18 to 20 hours of operation and is considered "dead." Activity is temporarily restored by regenerating the catalyst with a stream of air and stream at elevated temperature in the range of 700 to 850° F. The regeneration period is about 4 hours. Eventually, the catalyst cannot be restored by air-steam regeneration to an activity substantially above about 70–75 mol percent conversion and must be reactivated by other means or discarded.

This invention is concerned with a method of restoring an apparently "dead" catalyst consisting essentially of copper phosphate in admixture with calcium ortho phosphate which is not restorable with air and steam.

Accordingly, it is an object of the invention to provide a process for reactivating a catalyst consisting essentially of calcium ortho phosphate in admixture with copper ortho phosphate. Another object is to provide a reactivation process for restoring the activity of an acetylene hydration catalyst consisting essentially of calcium phosphate having deposited thereon an amount of copper ortho phosphate of less than about 0.5 weight percent, calculated as copper. Other aspects of the invention will become apparent upon consideration of the accompanying disclosure.

A broad aspect of the invention comprises contacting a calcium phosphate-copper phosphate catalyst with an aqueous solution of a copper compound capable of exchanging copper for calcium in the calcium ortho phosphate and producing a water soluble calcium compound which is then washed out of the composite catalyst. The preferred copper compound is copper acetate, $Cu(C_2H_3O_2)_2$, but other copper compounds effective in the process include the nitrate, chloride, chlorate, bromide-iodide, formate, and salicylate. The catalyst is frequently utilized in pelleted form such as 1/8" x 1/8" pellets although 1/16" x 1/16" up to 1/4" x 1/4" pellets may be utilized. In reactivating the catalyst in pelleted form, the pellets may simply be immersed in the dilute aqueous solution of the selected copper compound for an extended period such as 4 to 24 hours, or longer. However, it is preferable and more effective to crush the grind the pellets or otherwise communite them to small particle size and soak the comminuted catalyst in the copper solution. The reactivated particulate catalyst is then repelleted in any suitable manner for use.

*Example 1*

Catalyst pellets consisting of calcium ortho phosphate and copper ortho phosphate prepared by depositing copper ortho phosphate on calcium ortho phosphate so as to incorporate about 0.13 weight percent copper in the catalyst were used in the hydration of acetylene until their activity after steam-air regeneration was reduced to about 72 mol percent conversion of acetylene. The catalyst was in the form of 1/8" x 1/8" pellets.

A first portion of the catalyst was reactivated by soaking the pellets in dilute copper acetate and a second portion was reactivated by comminuting the pellets by grinding until 90 percent of the ground material was less than 100 mesh and then soaking the comminuted material in the copper acetate solution.

The copper acetate solution in each instance was prepared by dissolving 4.95 grams of copper acetate monohydrate in a quart of water. 824.2 grams of the pelleted catalyst in one instance and 824.2 grams of the finely divided catalyst in the other instance were soaked overnight with stirring in the prepared copper acetate solution. The resulting mixture was filtered in each case and the filtered material was washed four times with water to remove calcium acetate and residual impurities. The pellets and finely divided catalyst were dried at a temperature in the rang of 212 to 230° F. and the finely comminuted catalyst was pelleted by the punch and die method with a lubricant into 1/8" x 1/8" pellets. The reactivated catalysts contained about 0.29 weight percent Cu.

The repelleted and the reactivated pelleted catalyst along with the original catalyst were tested in the hydration of acetylene under the same conditions including catalyst bed temperature of 750° F., of mol ratio of steam to acetylene of 12 to 1, a space velocity of 68 volumes of acetylene per volume of catalyst per hour and a pressure of about atmospheric. The results of the tests are shown in the drawing, curve A representing the conversion effected by the original catalyst, curve B showing the conversion of the reactivated unrepelleted catalyst and curve C showing the conversion of the reactivated repelleted catalyst.

It can be seen that the activities of both the unrepelleted and the repelleted catalyst were excellent and that these catalysts maintained their activity reasonably well. The repelleted catalyst represented by curve C had high initial activity and maintained an activity of at least 88 mol percent conversion for about 24 hours. This is substantially better than any prior catalyst which required regeneration every 18 hours because of its activity dropping below about 70 to 75% conversion in this length of time.

The invention is applicable to the calcium and copper ortho phosphate catalyst made by any method. One method comprises immersing calcium ortho phosphate in finely divided form in copper acetate, or other copper activating solution, so as to exchange copper for calcium in the calcium phosphate until from about 0.1 to 0.5 weight percent of copper has been deposited in the catalyst and thereafter washing the calcium acetate from the composite, drying the composite, and forming pellets thereof. This type of pelleted catalyst is readily restored to activity preferably by comminuting, soaking the particles in a dilute aqueous solution of the selected copper compound, such as the acetate, washing occluded material from the composite with water, drying and repelleting the composite.

Tests have shown that the activity of calcium ortho phosphate-copper ortho phosphate catalyst for hydration of acetylene has a maximum conversion activity when the Cu content is about 0.30 weight percent of the catalyst. It is therefore advantageous to prepare the original catalyst with less than 0.30 weight percent Cu to allow for addition of small amounts of Cu by the reactivation method of the invention. A suitable procedure comprises depositing about 0.05 weight percent Cu in the catalyst and reactivating with an additional 0.05 to 0.10% of Cu by the method described herein. This allows several reactivations while keeping the Cu content near the optimum. The optimum working range is from about 0.05 to 0.5 weight percent. The original catalyst is preferably prepared with a Cu content in the range of 0.01 to 0.20 and more desirably in the range of 0.05 to 0.15 weight percent of the catalyst.

*Example II*

Test data demonstrate that it is highly advantageous to use reagent grade calcium ortho phosphate in preparing the catalyst of the invention. Catalysts were made by the method of Example I using $Ca_3(PO_4)_2$ of various grades from several manufacturers. The resulting catalysts were tested under substantially the same run conditions to determine the acetylene conversion for each. The data obtained are present in the table below.

TABLE

| Manufacturer of $Ca_3(PO_4)_2$ | Grade of $Ca_3(PO_4)_2$ | Acetylene Conversion (mol percent) |
|---|---|---|
| A | Reagent | ~100 |
| B | Reagent | ~100 |
| C | Dental 1 | 40-70 |
| C | Medicinal | <50 |
| A | N.F | <50 |
| D | N.F | <50 |
| E | Technical | <50 |
| C | Dental 2 | <50 |

Certain modifications of the invention will become apparent to those skilled in the art and the illustrative details disclosed are not to be construed as imposing unnecessary limitations on the invention.

I claim:
1. A process for increasing the activity of a substantially dead catalyst consisting essentially of reagent grade calcium orthophosphate in admixture with a small but effective concentration of $Cu_3(PO_4)_2$ which comprises the steps of:
   (1) contacting said catalyst with an aqueous solution of a compound of Cu so as to effect ion exchange of a small but effective amount of Cu with Ca and deposit a corresponding amount of fresh Cu in said catalyst; and
   (2) washing and drying the resulting composite.

2. The process of claim 1 wherein said compound of Cu is $Cu(C_2H_3O_2)_2$ and the amount of Ca deposited by ion exchange is in the range of 0.01 to 0.10 wt. percent of the reactivated catalyst.
3. The process of claim 1 wherein said compound of Cu is $Cu(NO_3)_2$.
4. The process of claim 1 wherein the concentration of $Cu_3(PO_4)_2$ is in the range of 0.01 to 0.5 weight percent calculated as Cu and the amount of Ca deposited by ion exchange is in the range of 0.01 to 0.10 wt. percent of the reactivated catalyst.
5. A process for increasing the activity of a pelleted catalyst consisting essentially of $Ca_3(PO_4)_2$ having deposited thereon an amount of $Cu_3(PO_4)_2$ in the range of 0.01 to 0.5 weight percent calculated as Cu which comprises the steps of:
   (1) comminuting the pelleted catalyst;
   (2) forming a dilute aqueous solution of a Cu compound capable of ion exchanging Cu for Ca of said catalyst and producing a water soluble calcium compound;
   (3) soaking the ground catalyst of step (1) in the solution of step (2) so as to deposit Cu from said solution in said catalyst in an amount in the range of 0.1 to 0.05 wt. percent of the reactivated catalyst by ion exchange with Ca;
   (4) recovering said catalyst from said solution and drying same; and
   (5) pelleting the dried catalyst.
6. The process of claim 5 wherein the Cu compound is $Cu(C_2H_3O_2)_2$.
7. The process of claim 5 wherein the Cu in said solution is in the range of 0.01 to 1.0 weight percent of the pelleted catalyst.
8. The process of claim 7 wherein said Cu compound is $Cu_3(PO_4)_2$.
9. The process of claim 1 wherein the $Ca_3(PO_4)_2$ is reagent grade.

References Cited by the Examiner

UNITED STATES PATENTS 1,882,712  10/1932  Andrussow et al. ____ 252—437
3,149,082  9/1964  Bowman et al. _____ 252—437

MAURICE A. BRINDISI, *Primary Examiner.*

LEON ZITVER, *Examiner.*